(12) United States Patent
Dudda et al.

(10) Patent No.: US 12,309,805 B2
(45) Date of Patent: May 20, 2025

(54) SPS WITH SKIPPING TRANSMISSIONS AND ADAPTIVE HARQ

(71) Applicant: TELEFONAKTIEBOLAGET LM ERICSSON (PUBL), Stockholm (SE)

(72) Inventors: Torsten Dudda, Wassenberg (DE); Henrik Enbuske, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 18/140,461

(22) Filed: Apr. 27, 2023

(65) Prior Publication Data
US 2023/0262721 A1  Aug. 17, 2023

Related U.S. Application Data

(63) Continuation of application No. 17/132,419, filed on Dec. 23, 2020, now Pat. No. 11,659,562, which is a
(Continued)

(51) Int. Cl.
*H04W 72/14* (2009.01)
*H04L 1/1812* (2023.01)
(Continued)

(52) U.S. Cl.
CPC .......... *H04W 72/23* (2023.01); *H04L 1/1819* (2013.01); *H04L 1/1822* (2013.01);
(Continued)

(58) Field of Classification Search
CPC .............. H04W 72/14; H04W 72/0446; H04L 1/1819; H04L 1/1822; H04L 1/1874; H04L 1/1887; H04L 1/1896; H04L 5/0053

See application file for complete search history.

(56) References Cited

U.S. PATENT DOCUMENTS

| | | | |
|---|---|---|---|
| 7,936,731 B2 | 5/2011 | Park | |
| 8,830,914 B2 | 9/2014 | Wang | |
| 9,507,669 B2 | 11/2016 | Sung | |
| 10,348,453 B2 | 7/2019 | Webb | |

(Continued)

FOREIGN PATENT DOCUMENTS

| | | |
|---|---|---|
| EP | 2151943 A2 | 2/2010 |
| EP | 2635067 A1 | 5/2020 |
| WO | 2009021349 A1 | 2/2009 |

OTHER PUBLICATIONS

Ericsson, Skip padding option for UL grants , 3GPP TSG-RAN WG2 #93 bis, R2-162782, Dubrovnik, Croatia, Apr. 11-15, 2016.
(Continued)

*Primary Examiner* — Eunsook Choi
(74) *Attorney, Agent, or Firm* — Frost Brown Todd LLP

(57) ABSTRACT

In one embodiment, a method in a wireless device for adaptive HARQ retransmissions comprises receiving, from a network node, a request to initiate an adaptive hybrid automatic repeat request (HARQ) retransmission. The method comprises identifying a HARQ process associated with the HARQ retransmission request and determining whether a HARQ buffer of the HARQ process is empty. In response to determining that the HARQ buffer is empty, the method comprises not delivering the HARQ information to the HARQ process and not triggering an adaptive HARQ retransmission.

10 Claims, 10 Drawing Sheets

Related U.S. Application Data continuation of application No. 16/301,339, filed as application No. PCT/IB2017/052807 on May 12, 2017, now Pat. No. 10,912,115.

(60) Provisional application No. 62/335,314, filed on May 12, 2016.

(51) Int. Cl.
*H04L 1/1822* (2023.01)
*H04L 1/1867* (2023.01)
*H04L 5/00* (2006.01)
*H04W 72/23* (2023.01)
*H04W 72/0446* (2023.01)

(52) U.S. Cl.
CPC .......... *H04L 1/1874* (2013.01); *H04L 1/1887* (2013.01); *H04L 1/1896* (2013.01); *H04L 5/0053* (2013.01); *H04W 72/0446* (2013.01)

(56) References Cited

U.S. PATENT DOCUMENTS

| | | |
|---|---|---|
| 10,548,169 B2 | 1/2020 | Yang |
| 2009/0235139 A1 | 9/2009 | Park |
| 2010/0027460 A1* | 2/2010 | Kim ............... H04L 1/1874 370/315 |
| 2010/0070816 A1 | 3/2010 | Park |
| 2010/0016973 A1 | 7/2010 | Kim et al. |
| 2011/0085509 A1 | 4/2011 | Park |
| 2011/0194502 A1* | 8/2011 | Sung ............... H04W 28/26 370/329 |
| 2012/0257559 A1 | 10/2012 | Kim |
| 2015/0327295 A1 | 11/2015 | Yang |

OTHER PUBLICATIONS

Intel Corporation, Further aspects of UL grant skipping, 3GPP TSG-RAN2 Meeting #93bis, R2-162467, Dubrovnik, Croatia Apr. 11-15, 2016.

* cited by examiner

SPS WITH SKIPPING TRANSMISSIONS AND ADAPTIVE HARQ

PRIORITY CLAIM

This application is a continuation of pending U.S. patent application Ser. No. 17/132,419, filed Dec. 23, 2020, which is a continuation of U.S. patent application Ser. No. 16/301,339, filed Nov. 13, 2018, now U.S. Pat. No. 10,912,115 issued Feb. 2, 2021, which is a 371 of International Application No. PCT/IB2017/052807, filed May 12, 2017, which claims the benefit of U.S. Provisional Application No. 62/335,314, filed May 12, 2016. The contents of these documents are hereby incorporated by reference herein.

TECHNICAL FIELD

The present disclosure relates generally to wireless communications and, more specifically, to SPS with skipping transmissions and adaptive HARQ.

BACKGROUND

In LTE-Rel-13 and LTE-Rel-14, latency reduction techniques are discussed and standardized in 3GPP. One latency reduction technique allows the eNB to configure a UE with semi-persistent scheduling (SPS) and, when no uplink (UL) data is available, the possibility of allowing the UE to skip uplink transmissions.

In SPS, the UE is configured with an uplink grant which is valid during the RRC configured SPS-occasions, e.g. every 10 ms or every 1 ms. When UL data is available, the UE can use the configured UL grant for transmission. According to pre-Rel-14 behavior, when no data is available for transmission, the UE sends a padding transmission on the configured UL grant. In Rel-14 it is standardized to allow skipping of these padding transmissions.

However, the UE's ability to skip transmissions introduced an uncertainty in the eNB. The eNB may question whether the UE intentionally skipped a transmission or whether an error occurred with the UE transmission. This uncertainty may cause the eNB to send a retransmission request to the UE. Retransmissions in SPS can be handled by non-adaptive and adaptive HARQ retransmissions. Adaptive retransmissions have the advantage that the used redundancy version can be adjusted leading to a more reliable retransmission. Generally, the eNB sends another PDCCH UL grant to the UE, triggering an adaptive HARQ retransmission by the UE.

A number of technical issues arise when a UE receives an adaptive HARQ retransmission grant triggered from the eNB after previously skipping a UL transmission.

SUMMARY

To address the foregoing problems, disclosed is a method in a wireless device for adaptive HARQ retransmissions. The method comprises receiving, from a network node, a request to initiate an adaptive hybrid automatic repeat request (HARQ) retransmission. The HARQ retransmission request may comprise HARQ information. The method may then identify a HARQ process associated with the HARQ retransmission request, determine whether a HARQ buffer of the HARQ process is empty, and in response to determining that the HARQ buffer is empty, not delivering the HARQ information to the HARQ process not triggering an adaptive HARQ retransmission.

In certain embodiments, the method may further include determining that a medium access control (MAC) entity of the wireless device is configured to skip an uplink transmission when no uplink data is available.

In certain embodiments, the method may further comprise determining that an uplink grant received on a physical downlink control channel (PDCCH) was addressed to the semi-persistent scheduling (SPS) cell radio network temporary identifier (C-RNTI).

In certain embodiments, prior to receiving the HARQ retransmission request from the network node, the method may further comprise determining that no uplink data is available for transmission to the network node and skipping a scheduled uplink transmission to the network node.

In certain embodiments, the request to initiate a HARQ retransmission received from the network node comprises a new data indicator (NDI) that has not been toggled.

Also disclosed is a wireless device. The wireless device comprises an interface and processing circuitry communicatively coupled to the interface. The interface may be configured to receive, from a network node, a request to initiate a HARQ retransmission. The HARQ retransmission request may comprise HARQ information. The processing circuitry may be configured to identify a HARQ process associated with the HARQ retransmission request, determine whether a HARQ buffer of the HARQ process is empty, and in response to determining that the HARQ buffer is empty, not triggering an adaptive HARQ retransmission.

In certain embodiments, the processing circuitry of the wireless device is further configured to determine that a MAC entity of the wireless device is configured to skip an uplink transmission when no uplink data is available.

In certain embodiments, the processing circuitry of the wireless device is further configured to determine that an uplink grant received on a PDCCH was addressed to the SPS C-RNTI.

In certain embodiments, prior to the interface receiving the HARQ retransmission request from the network node, the processing circuitry of the wireless device is further configured to determine that no uplink data is available for transmission to the network nodes, and skip a scheduled uplink transmission to the network node.

Also disclosed is a method performed by a network node for adaptive HARQ retransmissions in a communication network. The method comprising determining that an uplink transmission from a wireless device was not received, transmitting an adaptive HARQ retransmission request to the wireless device, determining that an adaptive HARQ retransmission was not received from the wireless device, determining whether to transmit another adaptive HARQ retransmission request to the wireless device, and in response to determining that another adaptive HARQ retransmission request should not be sent to the wireless device, stopping additional adaptive HARQ retransmission requests to the wireless device.

In certain embodiments, in response to determining that another adaptive HARQ retransmission request should be sent to the wireless device, the method may further comprise transmitting an adaptive HARQ retransmission request to the wireless device.

In certain embodiments, determining whether to transmit another adaptive HARQ retransmission request to the wireless device comprises counting a number of adaptive HARQ retransmission requests that have previously been sent to the wireless device, and determining that another adaptive HARQ retransmission request should not be sent when the number of adaptive HARQ retransmission requests reaches a preconfigured number. In certain embodiments, the preconfigured number is less than five.

In certain embodiments, in response to determining that another adaptive HARQ retransmission request should not be sent to the wireless device, the method further comprises determining that the wireless device skipped transmitting the uplink transmission.

Also disclosed is a network node. The network node comprises processing circuitry and an interface communicatively coupled to the processing circuitry. The processing circuitry may be configured to determine that an uplink transmission from a wireless device was not received. The interface may be configured to transmit an adaptive HARQ retransmission request to the wireless device. The processing circuitry is further configured to determine that an adaptive HARQ retransmission was not received from the wireless device, determine whether to transmit another adaptive HARQ retransmission request to the wireless device, in response to determining that another adaptive HARQ retransmission request should not be sent to the wireless device, stopping scheduling of another adaptive HARQ retransmission requests to the wireless device.

In certain embodiments, in response to determining that another adaptive HARQ retransmission request should be sent to the wireless device, the interface is further configured to transmit an adaptive HARQ retransmission request to the wireless device.

In certain embodiments, to determine whether to transmit another adaptive HARQ retransmission request to the wireless device, the processing circuitry is configured to count a number of adaptive HARQ retransmission requests that have previously been sent to the wireless device, and determine that another adaptive HARQ retransmission request should not be sent when the number of adaptive HARQ retransmission requests reaches a preconfigured number. In certain embodiments, the preconfigured number is less than five.

Certain embodiments of the present disclosure may provide one or more technical advantages. For example, certain embodiments may advantageously allow for well-defined UE behavior, which avoids potential unexpected errors in communication between an eNB and the UE. Certain embodiments of the present disclosure represent unconventional methods of accomplishing the technical issues involved with adaptive HARQ retransmissions. As another example, certain embodiments may advantageously reduce PDCCH resources. Other advantages may be readily apparent to one having skill in the art. Certain embodiments may have none, some, or all of the recited advantages.

BRIEF DESCRIPTION OF THE DRAWINGS

For a more complete understanding of the present disclosure, reference is now made to the following description, taken in conjunction with the accompanying drawings, in which.

DETAILED DESCRIPTION

As described above, it is unclear how a wireless device, such as a UE, should react when adaptive HARQ retransmissions are triggered by an evolved Node B (eNB) after the UE has skipped an uplink transmission. For example, if a UE does not have information to transmit, the UE may skip a UL transmission. The eNB may not identify that the UE skipped the UL transmission and may instead assume that the UL transmission failed. In response, the eNB may schedule an adaptive hybrid automatic repeat request (HARQ) retransmission. Upon receiving the HARQ retransmission grant, the UE may initiate an adaptive HARQ retransmission of the current HARQ buffer. However, since the UE did not previously transmit any data, the current buffer is empty.

An issue therefore exists regarding how the UE should react when receiving an adaptive HARQ retransmission grant when the HARQ buffer is empty. Because there is no current solution to this issue, the behavior of the UE cannot be anticipated, which may lead to additional unexpected error in the eNB and/or the UE. To overcome these issues, embodiments of the present disclosure provide solutions to handle adaptive HARQ retransmissions for SPS configured wireless devices that have skipped UL transmissions.

According to one embodiment, when the HARQ buffer of the process is empty, upon receiving the adaptive HARQ retransmission grant from the network node, the wireless device will determine that no adaptive HARQ retransmission should be performed and will ignore the adaptive HARQ retransmission grant. Thus, no adaptive HARQ retransmission is triggered. The eNB which triggered the retransmission grant will again not receive any response from the UE. The eNB may schedule another adaptive HARQ retransmission, which again, will not be sent by the UE. The eNB may stop scheduling adaptive HARQ retransmissions after a configurable number of retransmission attempts is reached.

Providing a well-defined UE response to adaptive HARQ retransmission grants when the UE has skipped a UL transmission provides a number of technical advantages not realized by current systems. Certain embodiments may advantageously allow for well-defined UE behavior, which avoids potential unexpected errors in communication between an eNB and the UE. As another example, certain embodiments may advantageously reduce PDCCH resources. FIGS. 1-10 provide additional details of SPS with skipping transmissions and adaptive HARQ that may provide these and other advantages.

Figure 1:
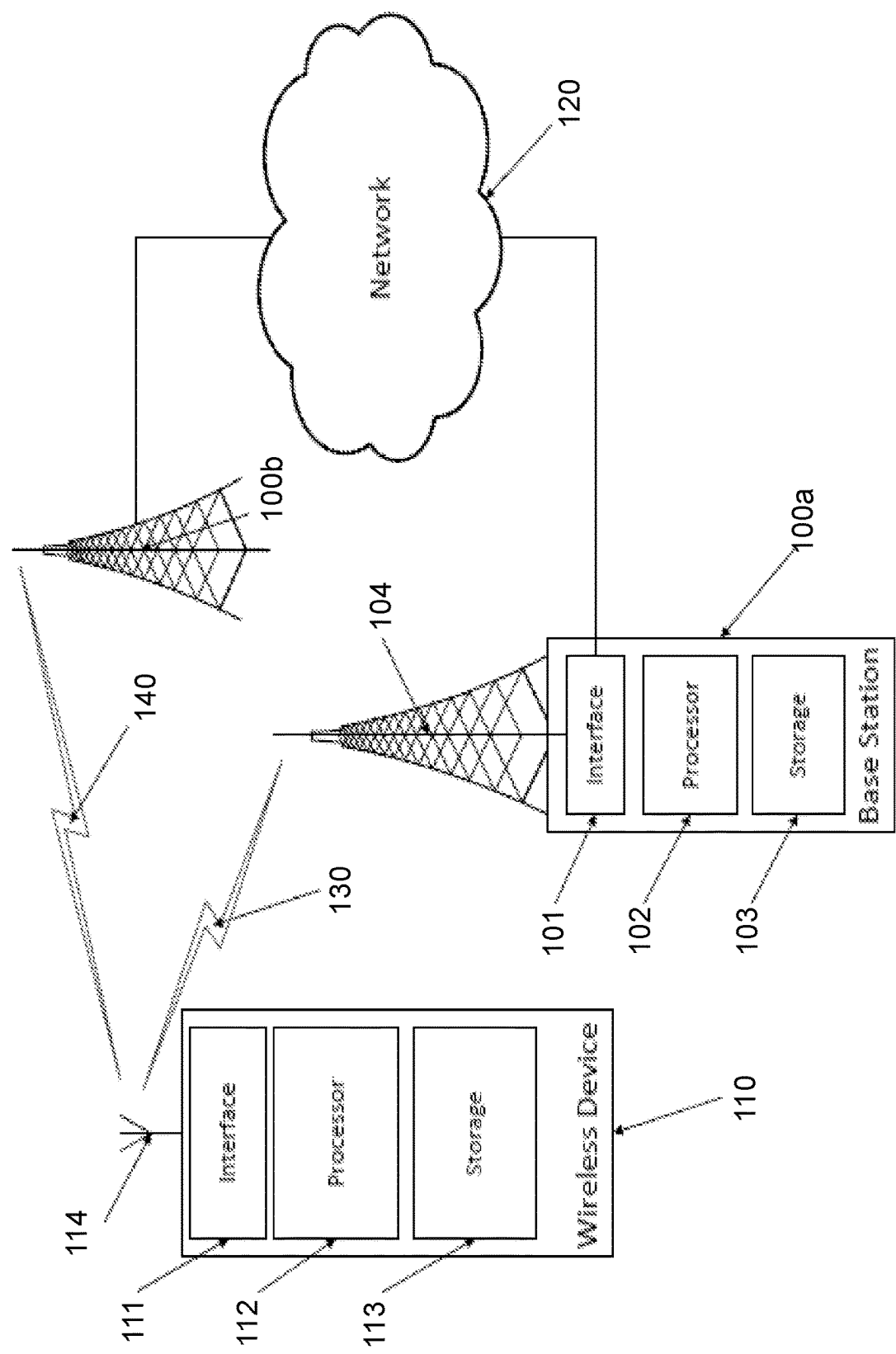
FIG. 1 is a schematic diagram of a wireless communication network, in accordance with certain embodiments.

FIG. 1 is a schematic diagram of a wireless communication network 100, in accordance with certain embodiments. In the illustrated embodiment, FIG. 1 includes network 120, network nodes 100*a-b* (network node 100*a* may be referenced generally as "network node 100"), and wireless device 110. Network node 100 may be interchangeably referred to as eNodeB (eNB) 100. Wireless device 110 may be interchangeably referred to as user equipment (UE) 110. In different embodiments, the wireless network may comprise any number of wired or wireless networks, network nodes, base stations (BS), controllers, wireless devices, relay stations, and/or any other components that may facilitate or participate in the communication of data and/or signals whether via wired or wireless connections.

Network 120 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Network node 100 may refer to any kind of network node 100, which may comprise a Node B, base station (BS), radio base station, multi-standard radio (MSR) radio node such as MSR BS, eNode B, network controller, radio network controller (RNC), multi-cell/multicast coordination entity (MCE), base station controller (BSC), relay node, base transceiver station (BTS), access point (AP), radio access point, transmission points, transmission nodes, remote radio unit (RRU), remote radio head (RRH), nodes in distributed antenna system (DAS), core network node (e.g., MSC, MME, SON node, coordinating node, etc.), O&M, OSS, positioning node (e.g., E-SMLC), MDT, an external node (e.g., third-party node, a node external to the current network), or any suitable network node.

Network node 100 comprises interface 101, processor 102, storage 103, and antenna 104. These components are depicted as single boxes located within a single larger box. In practice however, a network node 100 may comprise multiple different physical components that make up a single illustrated component (e.g., interface 101 may comprise terminals for coupling wires for a wired connection and a radio transceiver for a wireless connection). As another example, network node 100 may be a virtual network node in which multiple different physically separate components interact to provide the functionality of network node 100 (e.g., processor 102 may comprise three separate processors located in three separate enclosures, where each processor is responsible for a different function for a particular instance of network node 100). Similarly, network node 100 may be composed of multiple physically separate components (e.g., a NodeB component and a RNC component, a BTS component and a BSC component, etc.), which may each have their own respective processor, storage, and interface components. In certain scenarios in which network node 100 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 100 may be configured to support multiple radio access technologies (RATs). In such embodiments, some components may be duplicated (e.g., separate storage 103 for the different RATs) and some components may be reused (e.g., the same antenna 104 may be shared by the RATs).

Processor 102 may be a combination of one or more of a microprocessor, controller, microcontroller, central processing unit, digital signal processor, application specific integrated circuit, field programmable gate array, processing circuitry, or any other suitable computing device, resource, or combination of hardware, software and/or encoded logic operable to provide, either alone or in conjunction with other network node 100 components, such as storage 103, network node 100 functionality. For example, processor 102 may execute instructions stored in storage 103. Such functionality may include providing various wireless features discussed herein to a wireless devices, such as wireless device 110, including any of the features or benefits disclosed herein.

Storage 103 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 103 may store any suitable instructions, data or information, including software and encoded logic, utilized by network node 100. Storage 103 may be used to store any calculations made by processor 102 and/or any data received via interface 101.

Network node 100 also comprises interface 101 which may be used in the wired or wireless communication of signalling and/or data between network node 100, network 120, and/or wireless device 110. For example, interface 101 may perform any formatting, coding, or translating that may be needed to allow network node 100 to send and receive data from network 120 over a wired connection. Interface 101 may also include a radio transmitter and/or receiver that may be coupled to or a part of antenna 104. The radio may receive digital data that is to be sent out to other network nodes or wireless devices 110 via a wireless connection. The radio may convert the digital data into a radio signal having the appropriate channel and bandwidth parameters. The radio signal may then be transmitted via antenna 104 to the appropriate recipient (e.g., wireless device 110).

Antenna 104 may be any type of antenna capable of transmitting and receiving data and/or signals wirelessly. In some embodiments, antenna 104 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

Wireless device 110 may be any type of wireless endpoint, mobile station, mobile phone, wireless local loop phone, smartphone, user equipment (UE), desktop computer, PDA, cell phone, tablet, laptop, VoIP phone or handset, which is able to wirelessly send and receive data and/or signals to and from a network node, such as network node 100 and/or other wireless devices 110. For example, wireless device 110 may transmit wireless signals to one or more of network nodes 110*a-b*, and/or receive wireless signals from one or more of network nodes 110*a-b*. The wireless signals may contain voice traffic, data traffic, control signals, and/or any other suitable information. In some embodiments, an area of wireless signal coverage associated with a network node 110 may be referred to as a cell. In some embodiments, wireless device 110 may have device-to-device (D2D) capability. Thus, wireless device 110 may be able to receive signals from and/or transmit signals directly to another wireless device.

Wireless device 110 comprises interface 111, processor 112, storage 113, and antenna 114. Like network node 100, the components of wireless device 110 are depicted as single boxes located within a single larger box, however in practice a wireless device may comprises multiple different physical components that make up a single illustrated component (e.g., storage 113 may comprise multiple discrete microchips, each microchip representing a portion of the total storage capacity).

The wireless network may utilize wireless device 110 and network node 100 to implement the HARQ operations. HARQ operations provide error control and data recovery in the wireless network. The HARQ operations may be performed by HARQ entities. There is typically one HARQ entity at the MAC entity of a wireless device 110 for each service cell of the wireless network with a configured uplink. Thus, if wireless device 110 is communicating with network node 100a and network node 100b, then wireless device 110 may have two different HARQ entities in the MAC layer of wireless device 110. Each HARQ entity may maintain a number of parallel HARQ processes that allow for transmission to take place continuously while waiting for the HARQ feedback on the successful or unsuccessful reception of previous transmissions. For example, in some embodiments, when the physical layer is configured for uplink spatial multiplexing, there may be two HARQ processes associated with a given transmission time interval (TTI). For a given TTI, if an uplink grant is indicated for the TTI, the HARQ entity may identify the HARQ process(es) for which a transmission should take place.

Accordingly, a HARQ entity of wireless device 110 may identify the HARQ process associated with the TTI for which an uplink grant has been provided. In some embodiments, for a given TTI, if wireless device 110 determines that the MAC entity is configured to skip UL transmissions (e.g., the MAC entity of wireless device 110 is configured with skipUplinkTxSPS); the uplink grant received on PDCCH was addressed to the SPS cell radio network temporary identifier (C-RNTI); and the HARQ buffer of the identified HARQ process is empty, then wireless device 110 may ignore the uplink grant and not perform an adaptive HARQ retransmission.

Interface 111 may be used in the wireless communication of signalling and/or data between wireless device 110 and network node 100. For example, interface 111 may perform any formatting, coding, or translating that may be needed to allow wireless device 110 to send and receive data from network node 100 over a wireless connection. Interface 111 may also include a radio transmitter and/or receiver that may be coupled to or a part of antenna 114. The radio may receive digital data that is to be sent out to network node 100 via a wireless connection. The radio may convert the digital data into a radio signal having the appropriate channel and bandwidth parameters. The radio signal may then be transmitted via antenna 114 to network node 100.

Processor 112 may be a combination of one or more of a microprocessor, controller, microcontroller, central processing unit, digital signal processor, application specific integrated circuit, field programmable gate array, processing circuitry, or any other suitable computing device, resource, or combination of hardware, software and/or encoded logic operable to provide, either alone or in combination with other wireless device 110 components, such as storage 113, wireless device 110 functionality. Such functionality may include providing various wireless features discussed herein, including any of the features or benefits disclosed herein.

Storage 113 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 113 may store any suitable data, instructions, or information, including software and encoded logic, utilized by wireless device 110. Storage 113 may be used to store any calculations made by processor 112 and/or any data received via interface 111.

Antenna 114 may be any type of antenna capable of transmitting and receiving data and/or signals wirelessly. In some embodiments, antenna 114 may comprise one or more omni-directional, sector or panel antennas operable to transmit/receive radio signals between 2 GHz and 66 GHz. For simplicity, antenna 114 may be considered a part of interface 111 to the extent that a wireless signal is being used.

Figure 8:
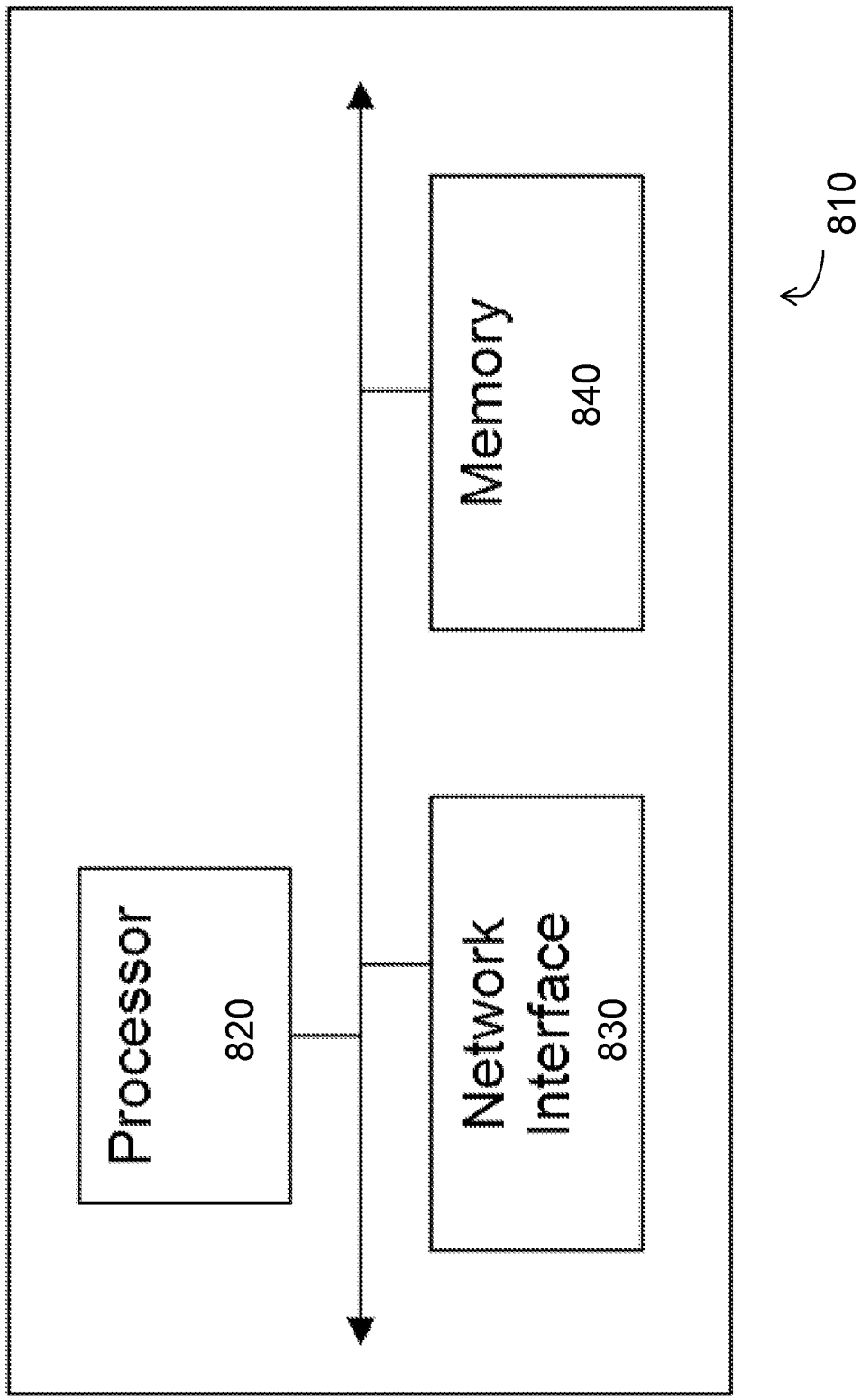
FIG. 8 is a schematic block diagram of an exemplary radio network controller or core network node, in accordance with certain embodiments.

In certain embodiments, network nodes 100 may interface with a radio network controller. The radio network controller may control network nodes 100 and may provide certain radio resource management functions, mobility management functions, and/or other suitable functions. In certain embodiments, the functions of the radio network controller may be performed by network node 100. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a PSTN, a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof. FIG. 8 describes additional functionality of a radio network controller.

In some embodiments, the core network node may manage the establishment of communication sessions and various other functionalities for wireless device 110. Wireless device 110 may exchange certain signals with the core network node using the non-access stratum (NAS) layer. In non-access stratum signaling, signals between wireless devices 110 and the core network node may be transparently passed through the radio access network. In certain embodiments, network nodes 100 may interface with one or more network nodes over an internode interface. For example, network nodes 100a and 100b may interface over an X2 interface.

Although FIG. 1 illustrates a particular arrangement of a wireless network, the present disclosure contemplates that the various embodiments described herein may be applied to a variety of networks having any suitable configuration. For example, the wireless network may include any suitable number of wireless devices 110 and network nodes 100, as well as any additional elements suitable to support communication between wireless devices or between a wireless device and another communication device (such as a landline telephone). Furthermore, although certain embodiments may be described as implemented in a long-term evolution (LTE) network, the embodiments may be implemented in any appropriate type of telecommunication system supporting any suitable communication standards and using any suitable components, and are applicable to any RAT or multi-RAT systems in which the wireless device receives and/or transmits signals (e.g., data). For example, the various embodiments described herein may be applicable to NR, LTE, LTE-Advanced, UMTS, HSPA, GSM, cdma2000, WiMax, WiFi, another suitable radio access technology, or any suitable As described above, the present disclosure contemplates various embodiments that provide solutions to handle adaptive HARQ retransmissions for SPS configured wireless devices 110 that have skipped UL transmissions to network node 100. For example, in one embodiment, a wireless device 110 may determine that no data is available for transmission and decide to skip a UL transmission. Network node 100 may determine that no UL transmission was received from wireless device 110. Network node 100 may schedule an adaptive HARQ operation by sending another UL grant over the physical downlink control channel (PDCCH) to wireless device 110, indicated to the SPS resources.

Upon receiving the adaptive HARQ retransmission grant (also referred to as a request), wireless device 110 may respond in several ways. In one embodiment, wireless device 110 may receive the adaptive HARQ retransmission grant and initiate an adaptive HARQ retransmission of the current HARQ buffer. In some embodiments, wireless device 110 will have skipped the UL transmission and the current HARQ buffer will be empty. Upon determining that the HARQ buffer of the process is empty, wireless device 110 may then decide not to deliver the received HARQ information from the adaptive HARQ retransmission grant to the HARQ process. Wireless device 110 may then decide not to trigger an adaptive HARQ retransmission. In this manner, wireless device 110 will ignore the uplink grant from network node 100 when: (1) wireless device 110 skips an UL transmission (e.g., when the MAC entity of wireless device 110 is configured with skipUplinkTxSPS); (2) wireless device 110 receives an uplink grant on the PDCCH addressed to the SPS cell radio network temporary identifier (C-RNTI); and (3) the HARQ buffer of the identified process is empty.

Any appropriate steps, methods, or functions may be performed through a computer program product that may, for example, be executed by the components and equipment illustrated in the figure above. For example, storage 103 may comprise non-transitory computer readable means on which a computer program can be stored. The computer program may include instructions which cause processor 102 (and any operatively coupled entities and devices, such as interface 101 and storage 103) to execute methods according to embodiments described herein. The computer program and/or computer program product may thus provide means for performing any steps herein disclosed.

FIGS. 2-5 are additional illustrate embodiments of the present disclosure describe how to handle adaptive HARQ retransmissions for SPS configured wireless device 110 communicating with network nodes 100a-b.

Figure 2:
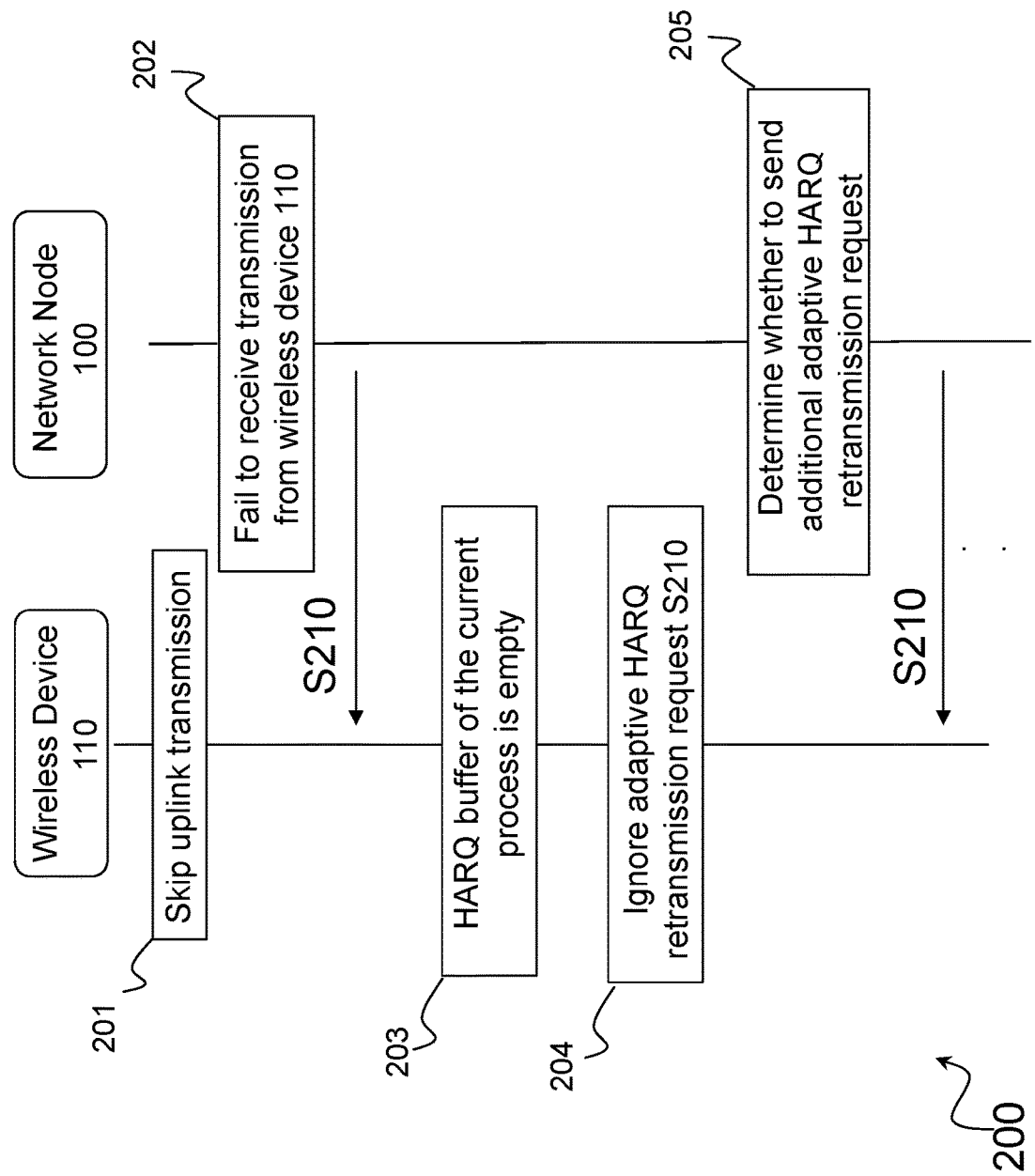
FIG. 2 illustrates a signal flow diagram describing a first option for responding to an adaptive HARQ retransmission request, in accordance with certain embodiments.

FIG. 2 illustrates a signal flow diagram 200 describing a first option for responding to an adaptive HARQ retransmission request, in accordance with certain embodiments. At a high level, signal flow diagram 200 describes an embodiment wherein wireless device 110 will ignore the adaptive HARQ retransmission grant transmitted from network node 100 when certain conditions are present.

At step 201, wireless device 110 may skip an uplink transmission to network node 100. For example, wireless device 110 may skip an uplink transmission when wireless device 110 is configured for SPS and has the ability to skip UL transmissions when no UL data is available.

At step 202, since wireless device 110 skipped the UL transmission, network node 100 fails to receive a transmission from wireless device 110. Network node 100 may not recognize that wireless device 110 skipped the uplink transmission and, instead, may assume that the UL transmission failed. Network node 100 may respond by scheduling an adaptive HARQ retransmission. In some embodiments, an adaptive HARQ retransmission may be indicated by addressing the SPS RNTI of wireless device 110 and by setting the new data indicator (NDI) field to 1 (i.e., indicating that NDI is not toggled). Network node 100 may then transmit adaptive HARQ retransmission grant S210 to wireless device 110.

At step 203, wireless device 110 may receive signal S210 and determine whether the HARQ buffer of the current process is empty. Here, since wireless device 110 skipped the UL transmission at step 201, the HARQ buffer of the current process will be empty. In some embodiments, wireless device 110 may ignore the adaptive HARQ retransmission grant (i.e., S210) when it is determined that the MAC entity of wireless device 110 is configured to skip UL transmissions (i.e., the MAC entity is configured with skipUplinkTxSPS) and/or when the UL grant (i.e., the adaptive HARQ retransmission signal S210) received on PDCCH was addressed to semi-persistent scheduling C-RNTI.

Upon determining that the HARQ buffer is empty, at step 204, wireless device 110 may ignore the adaptive HARQ retransmission request signal S210. For example, wireless device 110 may not deliver the received HARQ information from the adaptive HARQ retransmission request to the HARQ process and may not trigger an adaptive HARQ retransmission.

At step 205, network node 100 will again not receive any retransmission from wireless device 110. In some embodiments, network node 100 may schedule another adaptive HARQ retransmission request for wireless device 110. In some embodiments, network node 100 may stop scheduling adaptive HARQ retransmissions after determining that wireless device 110 is ignoring the retransmission request or upon determining that wireless device 110 skipped the UL transmission. For example, in some embodiments, network node 100 may stop scheduling adaptive HARQ retransmissions after a configurable number of retransmission attempts have been tried. The configurable number of retransmission attempts may be set to any suitable number (e.g., 0-5 attempts). In some embodiments, the preconfigured number may be set to a limit (e.g., the preconfigured number is less than five). While the above embodiments discuss using a configurable number to determine when to stop scheduling retransmission attempts, any suitable process may be used to determine when network node 100 should stop scheduling adaptive HARQ retransmissions.

At step 205, if network node 100 determines that another adaptive HARQ retransmission should be sent to wireless device 110, network node 100 may again send adaptive HARQ retransmission grant 210 to wireless device 110. The process of steps 203-205 may then repeat until network node 100 determines that another adaptive HARQ retransmission should not be sent and/or until network node 100 identifies that wireless device 110 skipped the UL transmission at step 201.

Figure 3:
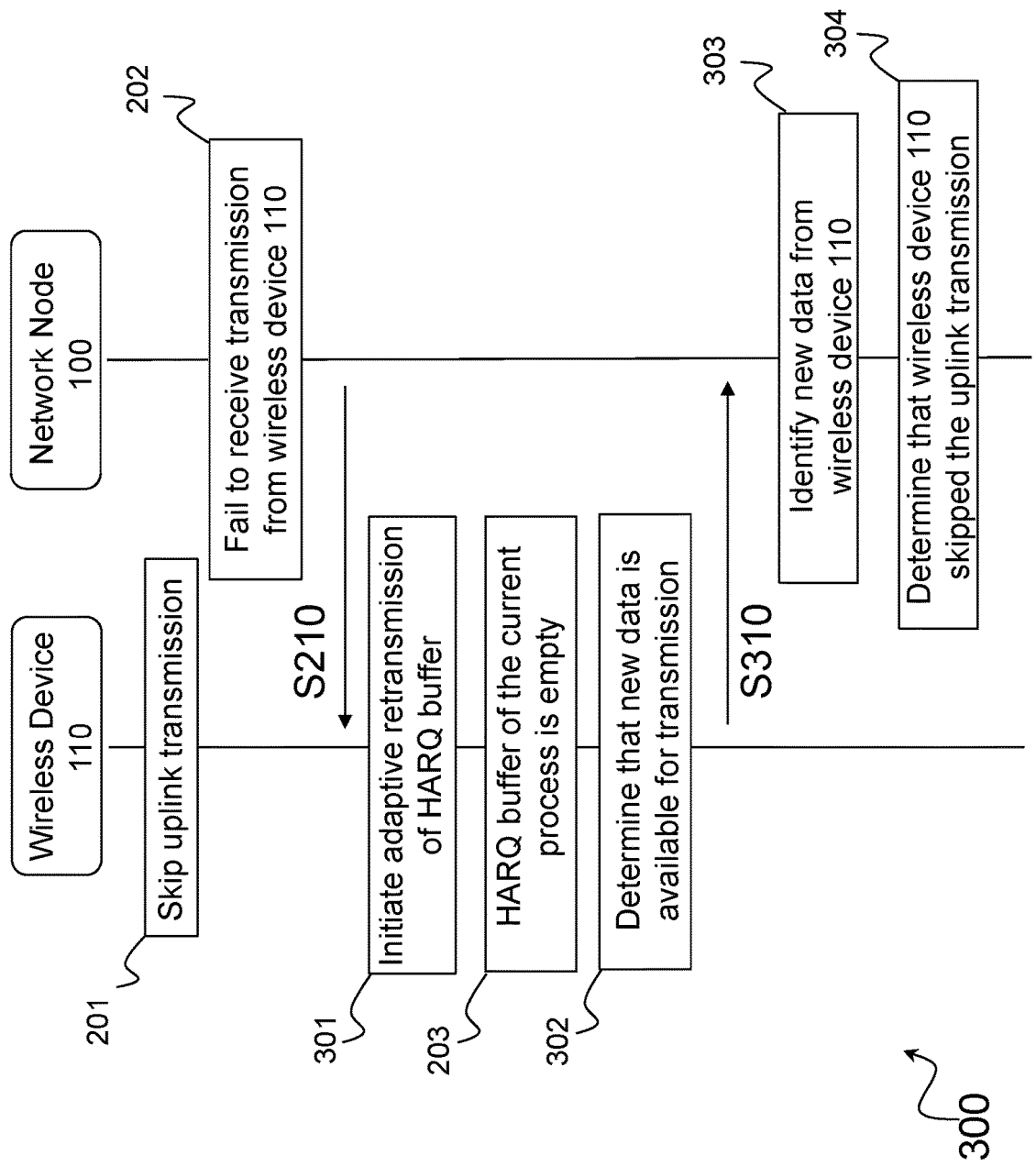
FIG. 3 illustrates a signal flow diagram describing a second option for responding to an adaptive HARQ retransmission request, in accordance with certain embodiments.

FIG. 3 illustrates a signal flow diagram 300 describing a second option for responding to an adaptive HARQ retransmission request, in accordance with certain embodiments. Generally, signal flow diagram 300 describes an embodiment wherein wireless device 110 will transmit new data, when available, in response to the adaptive HARQ retransmission grant transmitted from network node 100 when certain conditions are present. Network node 100 and wireless device 110 may perform steps 201-203 and S210 described above in reference to FIG. 2. Therefore, only steps that are new to FIG. 3 will be described.

At step 301, wireless device 110 may receive signal S210 and initiate an adaptive HARQ retransmission of the HARQ buffer of the current process. At step 302 wireless device 110 determines whether new data is available for transmission. If new data is available, the data can be sent directly to network node 100. Thus, instead of transmitting padding or skipping the UL retransmission, wireless device 110 may send the new data. This embodiment allows for resources to not be wasted by unnecessary transmissions (e.g., padding) or missed opportunities to transmit data (e.g., skipping the UL transmission). In some embodiments, if no new data is available, wireless device 110 may operate as described in FIG. 2 and ignore the adaptive HARQ retransmission request.

If wireless device 110 determines that new data is available for transmission at step 302, wireless device 110 may transmit new data S310 to network node 100. At step 303, network node 100 receives the new data and may identify that wireless device 110 transmitted new data. At step 304, based on the reception of new data, network node 100 may determine that wireless device 110 skipped a UL transmission at step 201. If network node 100 determines that wireless device 110 skipped the UL transmission for which adaptive HARQ retransmission signal S210 was previously sent, network node 100 may then determine not to schedule another retransmission request.

Figure 4:
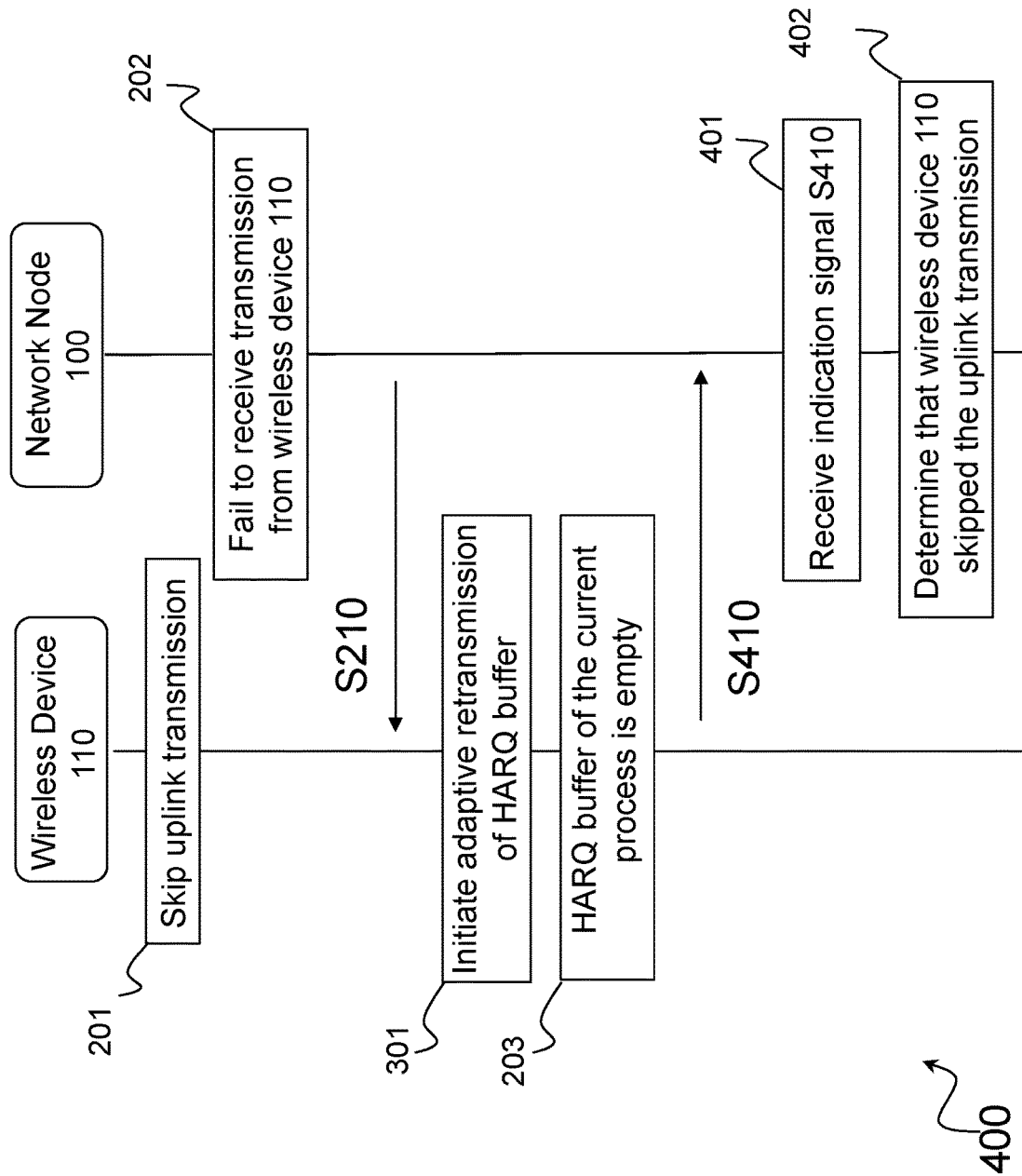
FIG. 4 illustrates a signal flow diagram describing a third option for responding to an adaptive HARQ retransmission request, in accordance with certain embodiments.

FIG. 4 illustrates a signal flow diagram 400 describing a third option for responding to an adaptive HARQ retransmission request, in accordance with certain embodiments. Signal flow diagram 400 describes an embodiment wherein wireless device 110 will transmit an indication to network node 100, which informs network node 100 that wireless device 110 skipped the UL transmission. Network node 100 and wireless device 110 may perform steps 201-203, 301, and S210 described above in reference to FIGS. 2 and 3. Therefore, only steps that are new to FIG. 4 will be described.

After receiving the adaptive HARQ retransmission grant S210 from network node 100 and determining that the HARQ buffer of the current process is empty, wireless device 110 may transmit indication S410 to network node 100.

At step 401, network node 100 may receive indication signal S410. Indication signal S410 may indicate to network node 100 that wireless device 110 skipped the UL transmission at step 201 and, therefore, network node 100 should not schedule another adaptive HARQ retransmission. By not scheduling additional adaptive HARQ retransmissions, no further PDCCH resources are wasted. Accordingly at step 402, network node 100 determines that wireless device 110 skipped the UL transmission and determines that no further adaptive HARQ retransmissions should be scheduled.

Indication signal S410 may take any suitable format and include any suitable data. Moreover, the contents of indication signal S410 may change based on one or more factors. For example, if wireless device 110 has new data to transmit, indication signal S410 may include the new data. In this embodiment, upon receiving the new data, network node 100 may react as described in steps 303 and 304 from FIG. 3. If no new data is available, wireless device 110 may instead transmit padding as part of indication signal S410. In some embodiments, wireless device 110 may always send padding as part of indication signal S410, independent of whether new data is available.

In certain embodiments, wireless device 110 may transmit a MAC control element as part of indication signal S410. The MAC control element may indicate to network node 100 that wireless device 110 skipped the UL transmission at step 201 and there is nothing for retransmission.

Figure 5:
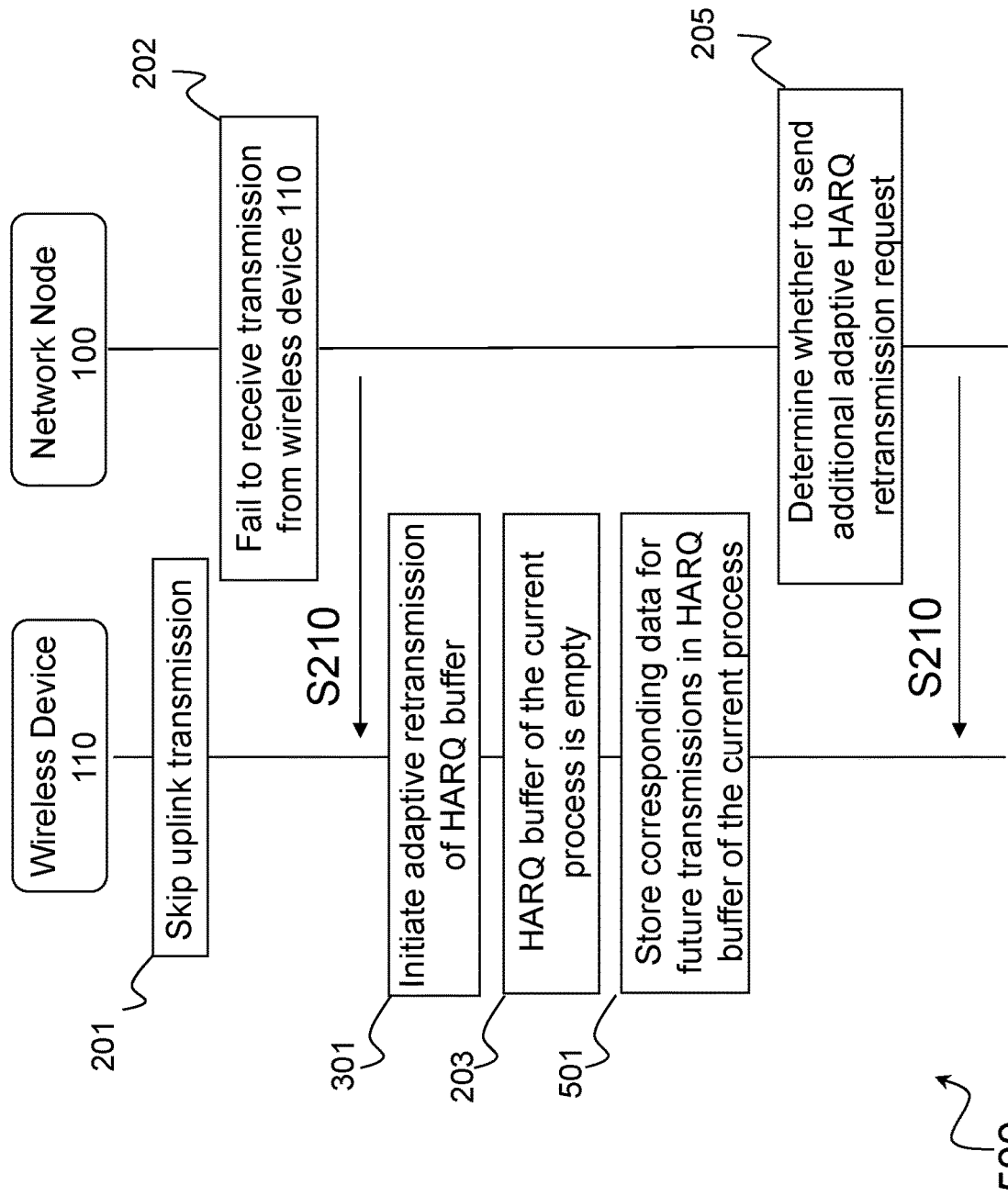
FIG. 5 illustrates a signal flow diagram describing a fourth option for responding to an adaptive HARQ retransmission request, in accordance with certain embodiments.

FIG. 5 illustrates a signal flow diagram 500 describing a fourth option for responding to an adaptive HARQ retransmission request, in accordance with certain embodiments. Signal flow diagram 500 describes an embodiment wherein the corresponding data that should have been sent, such as padding or regular BSR, is stored in the HARQ buffer of the current process. Thus, if network node 100 transmits another adaptive HARQ retransmission, the HARQ buffer of the current process will no longer be empty and may transmit the stored information. Network node 100 and wireless device 110 may perform steps 201-205, 301 and S210 described above in reference to FIGS. 2 and 3. Therefore, only steps that are new to FIG. 5 will be described.

After receiving adaptive HARQ retransmission grant S210 from network node 100 and determining that the HARQ buffer of the current process is empty (step 203), at step 501, wireless device 110 may store the corresponding data that should have been sent, the MAC PDU for transmission (padding BSR, regular BSR, etc.) in the HARQ buffer of the current HARQ process. In some embodiments, wireless device 110 may then decide not to transmit a response signal to network node 100.

As described above, at step 205, network node 100, which triggered the original retransmission grant, will again not receive any retransmission from wireless device 110. In some embodiments, network node 100 may schedule another adaptive HARQ retransmission request for wireless device 110. If network node 100 determines that an additional adaptive HARQ retransmission request should be sent to wireless device 110 (e.g., using signal S210), wireless device 110 may respond using the stored MAC PDU in the HARQ buffer. In this manner, wireless device 110 may skip an UL transmission and skip an initial response to an adaptive HARQ retransmission grant. However, should an additional retransmission grant be received by wireless device 110, the HARQ buffer of the current process will no longer be empty and wireless device 110 may transmit the stored information.

Figure 6:
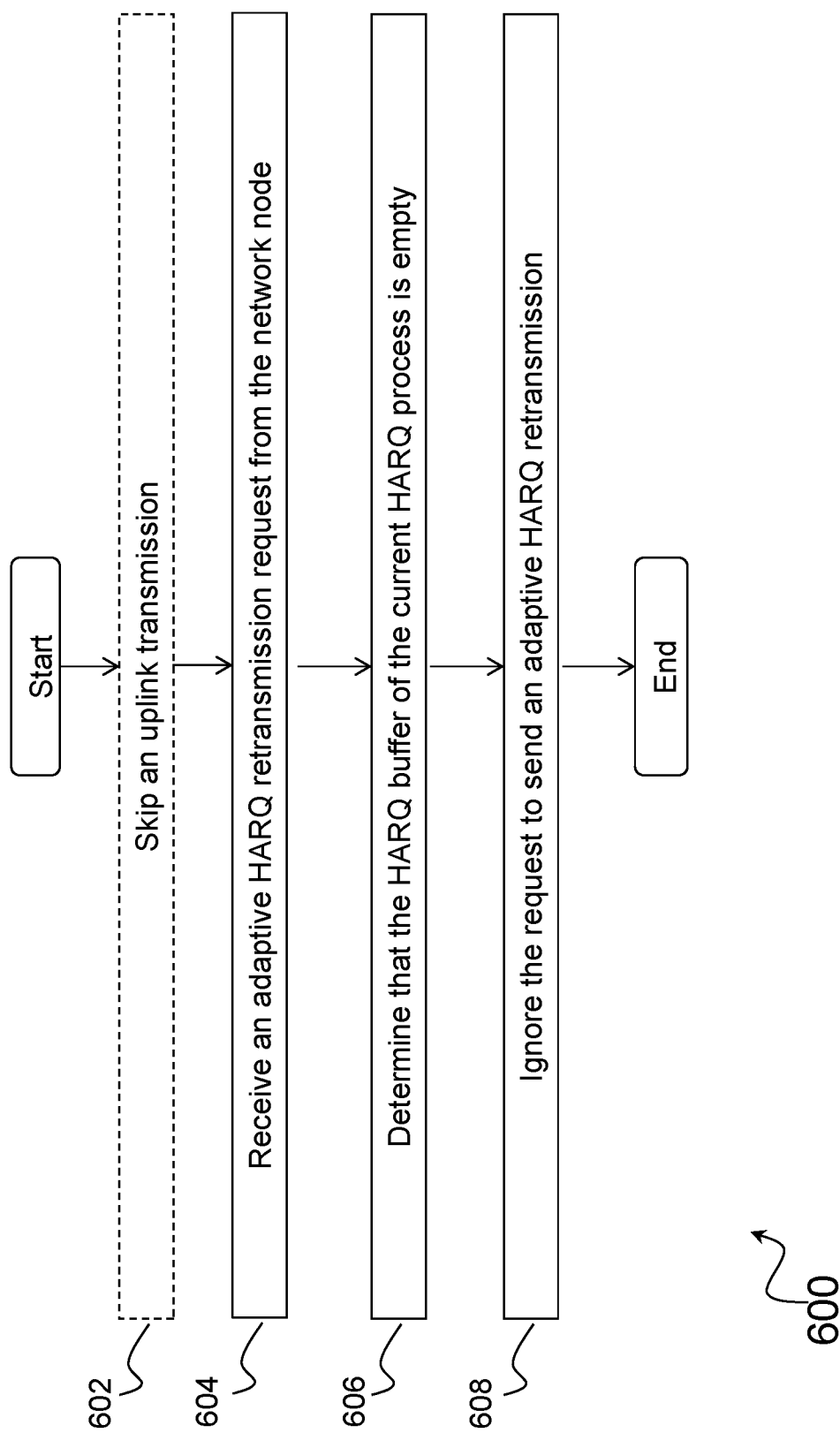
FIG. 6 is a flow chart of a method in a wireless device, in accordance with certain embodiments.
Figure 7:
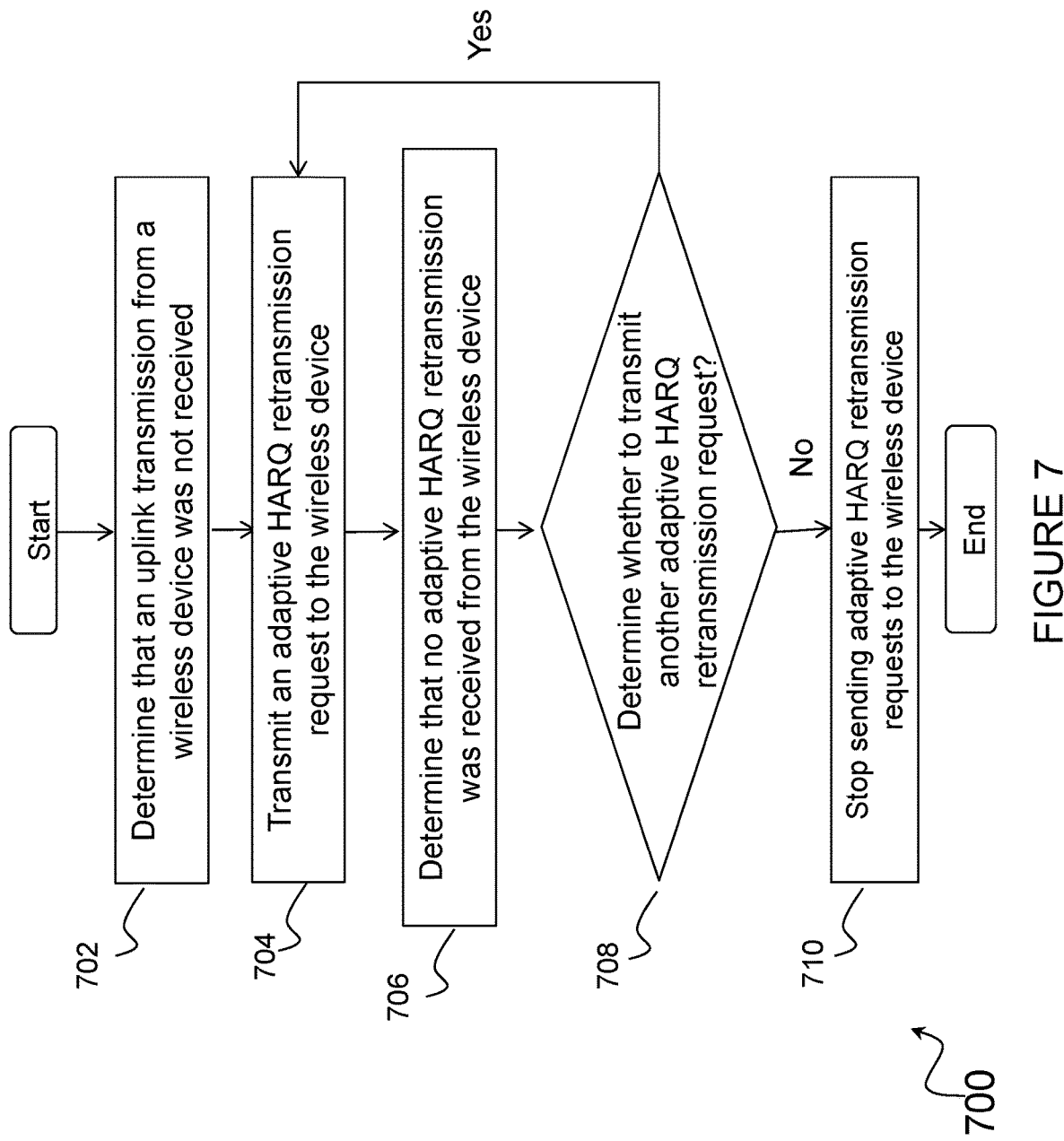
FIG. 7 is a flow chart of a method in a network node, in accordance with certain embodiments.

Based on the forgoing descriptions of FIGS. 2-5, the present disclosure contemplates a number of embodiments for how to handle adaptive HARQ retransmissions for SPS configured wireless devices 110 that have skipped UL transmissions to network nodes 100a-b. FIGS. 6 and 7 provide additional detail on methods of SPS with skipping transmissions and adaptive HARQ.

FIG. 6 is a flow chart of a method 600 in a wireless device 110, in accordance with certain embodiments. In some embodiments, method 600 may be performed by wireless device 110 receiving an adaptive HARQ retransmission request. At step 602, wireless device 110 may skip a UL transmission to network node 100. However, in some embodiments, step 602 may be optional and the method may begin with step 604. At step 604, wireless device 110 may receive an adaptive HARQ retransmission request from network node 100. In some embodiments, the adaptive HARQ retransmission grant may be indicated by addressing the SPS RNTI of wireless devices 110 and/or by setting the NDI to 1 (i.e., indicating that NDI is not toggled).

Upon receiving the HARQ retransmission grant, wireless device may initiate an adaptive HARQ retransmission of the HARQ buffer of the current process. For example, at step 606 wireless device 110 may determine that the HARQ buffer of the current HARQ process is empty since wireless device 110 skipped the earlier UL transmission at step 602. Upon determining that the HARQ buffer is empty, at step 608, wireless device 110 may ignore the adaptive HARQ retransmission grant from network node 100. In some embodiments, ignoring the adaptive HARQ retransmission grant may include not delivering the received HARQ information from the adaptive HARQ retransmission grant to the current HARQ process and/or not triggering an adaptive HARQ retransmission.

In some embodiments, before ignoring the adaptive HARQ retransmission grant, wireless device 110 may also determine that the MAC entity of wireless device 110 is configured to skip UL transmissions and/or that the UL grant received on PDCCH was addressed to semi-persistent scheduling C-RNTI. After step 608, the method may end.

FIG. 7 is a flow chart of a method 700 in a network node 100, in accordance with certain embodiments. In some embodiments, method 700 may be performed by network node 100 is for adaptive HARQ retransmissions in a communication network. At step 702, network node 100 may determine that a UL transmission from wireless device 110 was not received. Network node 100 may not know whether wireless device 110 intentionally skipped a UL transmission or whether an error occurred with the UL transmission.

At step 704, network node 100 may transmit an adaptive HARQ retransmission request to wireless device 100. However, in certain situations wireless device 110 may not respond to the retransmission request. For example, if wireless device 110 is performing the method described in FIG. 6, wireless device 110 may ignore the adaptive HARQ retransmission request when wireless device 110 skipped the UL transmission.

At step 706, network node 100 may determine that no adaptive HARQ retransmission was received from wireless device 110. Network node 100 may still be unclear whether wireless device 110 is intentionally non-responsive or whether there is a continuing transmission error. Thus, at step 708, network node 100 determines whether to transmit another adaptive HARQ retransmission request to wireless device 110. For example, in some embodiments, network node 100 may stop scheduling adaptive HARQ retransmissions after a configurable number of retransmission attempts have been tried. The configurable number of retransmission attempts may be set to any suitable number, including but not limited to 0-5 attempts. As another example, network node 100 may stop scheduling adaptive HARQ retransmissions after determining that wireless device 110 is ignoring the retransmission request or upon determining that wireless device 110 skipped the UL transmission. The foregoing examples are merely illustrative. Any suitable process may be used to determine when network node 100 should stop scheduling adaptive HARQ retransmissions.

If network node 100 determines at step 708 to transmit another adaptive HARQ retransmission, the process may return to step 704. In some embodiments, network node 100 may also update an internal counter to keep track of the number of times an adaptive HARQ retransmission request has been sent to wireless device 110.

If network node 100 determines at step 708 to not transmit another adaptive HARQ retransmission, the process may proceed to step 710. At step 710, network node 100 may stop sending adaptive HARQ retransmission requests to the wireless device. In some embodiments, network node 100 may assume that network node 100 skipped the UL transmission and that any further retransmission requests would unnecessarily waste PDCCH resources and/or create undesired PDCCH interference.

FIG. 8 is a schematic block diagram of an exemplary radio network controller or core network node 810, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 810 includes processor 820, memory 830, and network interface 840. In some embodiments, processor 820 executes instructions to provide some or all of the functionality described above as being provided by the network node, memory 830 stores the instructions executed by processor 820, and network interface 840 communicates signals to any suitable node, such as a gateway, switch, router, Internet, Public Switched Telephone Network (PSTN), network nodes 100, radio network controllers or core network nodes 810, etc.

Processor 820 may include any suitable combination of hardware and software implemented in one or more modules to execute instructions and manipulate data to perform some or all of the described functions of the radio network controller or core network node 810. In some embodiments, processor 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processor 820 and may refer to any suitable device operable to receive input for the network node, send output from the network node, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Other embodiments of the network node may include additional components beyond those shown in FIG. 8 that may be responsible for providing certain aspects of the network node's functionality, including any of the functionality described above and/or any additional functionality (including any functionality necessary to support the embodiments described above).

Figure 9:
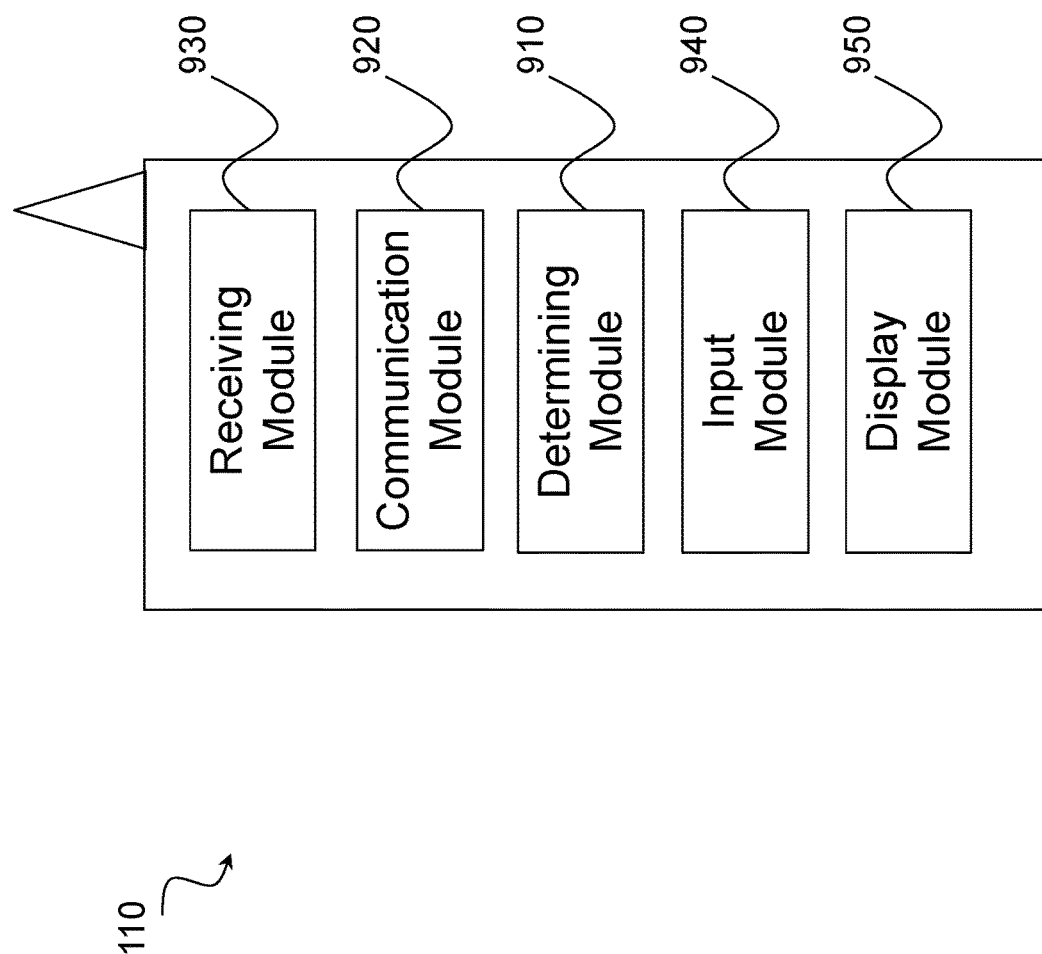
FIG. 9 is a schematic block diagram of an exemplary wireless device, in accordance with certain embodiments.

FIG. 9 is a schematic block diagram of an exemplary wireless device 110, in accordance with certain embodiments. Wireless device 110 may include one or more modules. For example, wireless device 110 may include a determining module 910, a communication module 920, and a receiving module 930. Optionally, wireless device 110 may include an input module 940, a display module 950, and any other suitable modules. Wireless device 110 may perform the response to receiving an adaptive HARQ retransmission request described above with respect to FIGS. 1-7.

Determining module 910 may perform the processing functions of wireless device 110. In certain embodiments, wireless device 110 may perform any of the functions described above with respect to FIGS. 1-7. In one example embodiment, determining module 910 may decide to skip an uplink transmission to network node 100. For example, in some embodiments, wireless device 110 may skip an uplink transmission when wireless device 110 is be configured for SPS and has the ability to skip UL transmissions when no UL data is available. In response to receiving an adaptive HARQ retransmission request from network node 100, determining module 910 may also initiate an adaptive HARQ retransmission of the HARQ buffer of the current process. For example, determining module 910 may determine that the HARQ buffer of the current HARQ process is empty since wireless device 110 skipped the earlier UL transmission. Upon determining that the HARQ buffer is empty, determining module 910 may ignore the request to initiate an adaptive HARQ retransmission from network node 100 (e.g., ignore the UL grant).

In some embodiments, ignoring the adaptive HARQ retransmission grant may include not delivering the received HARQ information from the adaptive HARQ retransmission grant to the current HARQ process and/or not triggering an adaptive HARQ retransmission. According to another example embodiment, determining module 910 may determine that the MAC entity of wireless device 110 is configured to skip UL transmissions and/or that the UL grant received on PDCCH was addressed to semi-persistent scheduling C-RNTI, before ignoring the adaptive HARQ retransmission grant.

Determining module 910 may include or be included in one or more processors, such as processor 112 described above in relation to FIG. 1. Determining module 910 may include analog and/or digital circuitry configured to perform any of the functions of determining module 910 and/or processor 112 described above. The functions of determining module 910 described above may, in certain embodiments, be performed in one or more distinct modules.

Communication module 920 may perform the communication functions of wireless device 110. In certain embodiments, communication module 920 may perform any of the communication functions described above with respect to FIGS. 1-7. In some embodiments, communication module 920 may transmit signals to network node 110 in response to wireless device 110 receiving the adaptive HARQ retransmission request. For example, communication module 920 may transmit new data as disclosed in FIG. 3 (signal S310) or the indication signal (signal S410) as disclosed in FIG. 4.

Communication module 920 may transmit messages to one or more of network nodes 100a-b of the wireless network described in FIG. 1. Communication module 920 may include a transmitter and/or a transceiver, such as interface 111 and/or antenna 114 described above in relation to FIG. 1. Communication module 920 may include circuitry configured to wirelessly transmit messages and/or signals. In particular embodiments, communication module 920 may receive messages and/or signals for transmission from determining module 910. In certain embodiments, the functions of communication module 920 described above may be performed in one or more distinct modules.

Receiving module 930 may perform the receiving functions of wireless device 110. In certain embodiments, receiving module 930 may perform any of the receiving functions of wireless device 110 described above with respect to FIGS. 1-7. In one example embodiment, receiving module 930 may receive the adaptive HARQ retransmission request(s) from network node 100 (e.g., signal S210). Receiving module 930 may include a receiver and/or a transceiver, such as interface 111 and/or antenna 114 described above in relation to FIG. 1. Receiving module 930 may include circuitry configured to wirelessly receive messages and/or signals. In particular embodiments, receiving module 930 may communicate received messages and/or signals to determining module 910.

Optionally, wireless device 110 may include input module 940. Input module 940 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 910.

Optionally, wireless device 110 may include display module 950. Display module 950 may present signals on a display of wireless device 110. Display module 950 may include the display and/or any appropriate circuitry and hardware configured to present signals on the display. Display module 950 may receive signals to present on the display from determining module 910.

Determining module 910, communication module 920, receiving module 930, input module 940, and display module 950 may include any suitable configuration of hardware and/or software. Wireless device 110 may include additional modules beyond those shown in FIG. 9 that may be responsible for providing any suitable functionality, including any of the functionality described above and/or any additional functionality (including any functionality necessary to support the various solutions described herein).

Figure 10:
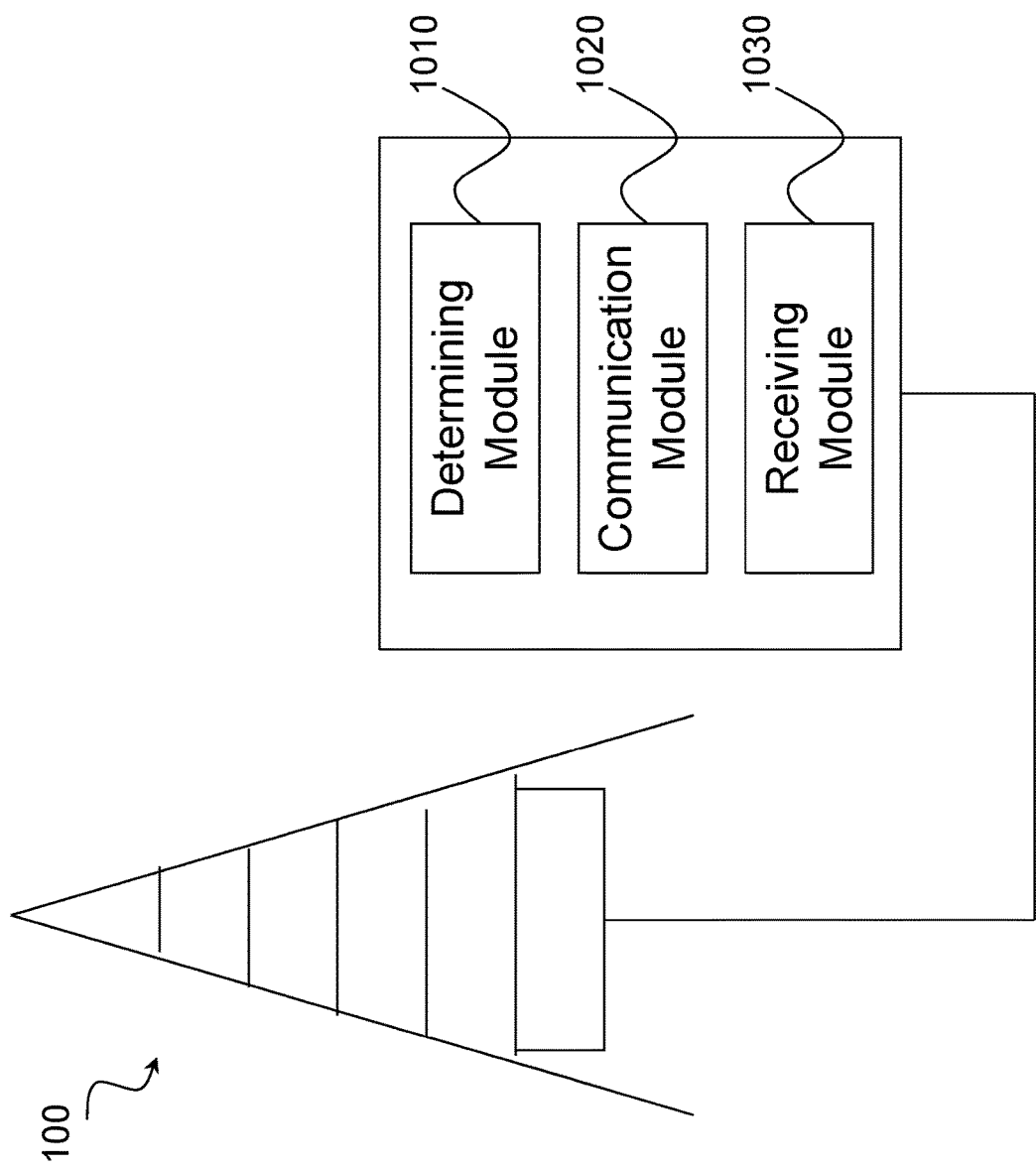
FIG. 10 is a schematic block diagram of an exemplary network node, in accordance with certain embodiments.

FIG. 10 is a block schematic of an exemplary network node 100, in accordance with certain embodiments. Network node 100 may include one or more modules. For example, network node 100 may include determining module 1010, communication module 1020, receiving module 1030, and any other suitable modules. In some embodiments, one or more of determining module 1010, communication module 1020, receiving module 1030, or any other suitable module may be implemented using one or more processors, such as processor 102 described above in relation to FIG. 1. In certain embodiments, the functions of two or more of the various modules may be combined into a single module. Network node 100 may perform one or more steps of the adaptive HARQ retransmission process described above in reference to FIGS. 1-7.

Determining module 1010 may perform the processing functions of network node 100. In certain embodiments, determining module 1010 may perform any of the functions of network node described above with respect to FIGS. 1-7. In one example embodiment, determining module 1010 may determine that an uplink transmission from wireless device 110 was not received. Determining module 1010 may also determine that network node 100 did not receive an adaptive HARQ retransmission from wireless device 110 in response to network node 100 transmitting an Adaptive HARQ retransmission request. Determining module 1010 may then determine whether network node 100 should transmit a subsequent adaptive HARQ retransmission request to wireless device 110.

In response to determining that another adaptive HARQ retransmission request should not be sent to wireless device 110, determining module 1010 may stop the scheduling of another adaptive HARQ retransmission request. In some embodiments, determining module 1010 determines whether to transmit another adaptive HARQ retransmission request by counting a number of adaptive HARQ retransmission requests that have previously been transmitted to wireless device 110 and determining that another adaptive HARQ retransmission request should not be sent when the number of adaptive HARQ retransmission requests reaches a preconfigured number (e.g., 1, 2, 3, 4, or 5 etc.).

In some embodiments, determining module 1010 may determine that wireless device 110 skipped an uplink transmission and no adaptive HARQ retransmission is necessary in response to determining that the preconfigured number of adaptive HARQ retransmissions have been sent to wireless device 110.

Determining module 1010 may include or be included in one or more processors, such as processor 102 described above in relation to FIG. 1. Determining module 1010 may include analog and/or digital circuitry configured to perform any of the functions of determining module 1010 and/or processor 102 described above. The functions of determining module 1010 may, in certain embodiments, be performed in one or more distinct modules. For example, in certain embodiments some of the functionality of determining module 1010 may be performed by an allocation module.

Communication module 1020 may perform the transmission functions of network node 100. In certain embodiments, network node 100 may perform any of the functions of the node described above with respect to FIGS. 1-7. In one example embodiment, communication module 1020 may transmit adaptive HARQ retransmission requests to wireless device 110. In some embodiments, an adaptive HARQ retransmission request sent from communication module 1020 may be indicated by addressing the SPS RNTI of wireless device 110 and/or by setting the NDI to 1 (i.e., indicating that NDI is not toggled).

Communication module 1020 may transmit messages to one or more of wireless devices 110. Communication module 1020 may include a transmitter and/or a transceiver, such as transceiver 1010 described above in relation to FIG. 10. Communication module 1020 may include circuitry configured to wirelessly transmit messages and/or signals. In particular embodiments, communication module 1020 may receive messages and/or signals for transmission from determining module 1010 or any other module.

Receiving module 1030 may perform the receiving functions of network node 100. In certain embodiments, receiving module 1030 may perform any of the functions of network node 100 described in FIGS. 1-7. In one example embodiment, receiving module 1030 may receive new data (signal S310) from wireless device 110 in response to network node 100 sending an adaptive HARQ retransmissions request (signal S210) to wireless device 110. In some embodiments, receiving module 1030 may receive an indication signal (signal S410) from wireless device 110. The indication signal may be transmitted from wireless device 110 in response to network node 100 sending an adaptive HARQ retransmissions request (signal 210) to wireless device 110. Indication signal may comprise any suitable data including new data and/or padding.

Receiving module 1030 may receive any suitable information from wireless device 110 Receiving module 1030 may include a receiver and/or a transceiver, such as interface 101 and/or antenna 104, which are described above in relation to FIG. 1. Receiving module 1030 may include circuitry configured to wirelessly receive messages and/or signals. In particular embodiments, receiving module 1030 may communicate received messages and/or signals to determining module 1010 or any other suitable module.

Determining module 1010, communication module 1020, and receiving module 1030 may include any suitable configuration of hardware and/or software. Network node 100 may include additional modules beyond those shown in FIG. 10 that may be responsible for providing any suitable functionality, including any of the functionality described above and/or any additional functionality (including any functionality necessary to support the various solutions described herein).

Modifications, additions, or omissions may be made to the systems and apparatuses disclosed herein without departing from the scope of the disclosure. Although the above description and embodiments refer to the handling of adaptive HARQ retransmissions for skipping transmission on SPS resources, the disclosure includes handling adaptive HARQ retransmissions when skip padding is done on dynamically scheduled resources and UL transmission. Furthermore, in some embodiments, wireless device 110 may be configured to allow non-adaptive HARQ retransmissions on SPS granted resources. In certain embodiments, adaptive HARQ retransmission grants may override non-adaptive HARQ retransmission occasions.

Moreover, the components of the systems and apparatuses may be integrated or separated. The operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Any steps described herein are merely illustrative of certain embodiments. It is not required that all embodiments incorporate all the steps disclosed nor that the steps be performed in the exact order depicted or described herein. Furthermore, some embodiments may include steps not illustrated or described herein, including steps inherent to one or more of the steps disclosed herein.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processors 102 and/or 112, possibly in cooperation with storage 103 and/or 113. Processors 102 and/or 112 and storage 103 and/or 113 may thus be arranged to allow processors 102 and/or 112 to fetch instructions from storage 103 and/or 113 and execute the fetched instructions to allow the respective functional module to perform any steps or functions disclosed herein.

Modifications, additions, or omissions may be made to the methods disclosed herein without departing from the scope of the disclosure. The methods may include more, fewer, or other steps. Additionally, steps may be performed in any suitable order. Although this disclosure has been described in terms of certain embodiments, alterations and permutations of the embodiments will be apparent to those skilled in the art.

Accordingly, the above description of the embodiments does not constrain this disclosure. Other changes, substitutions, and alterations are possible without departing from the spirit and scope of this disclosure, as defined by the following claims.

Abbreviations used in the preceding description include:
AP Access Point
BS Base Station
BSC Base Station Controller
BTS Base Transceiver Station
C-RNTI Cell Radio Network Temporary Identifier
D2D Device-to-device
DAS Distributed Antenna System
eNB evolved Node B
HARQ Hybrid Automatic Repeat Request
LAN Local Area Network
LTE Long Term Evolution
MAC Medium Access Control
MAN Metropolitan Area Network
MCE Multi-cell/multicast Coordination Entity
MSR Multi-standard Radio
NAS Non-Access Stratum
NDI New Data Indicator
PDCCH Physical Downlink Control Channel
PSTN Public Switched Telephone Network
RNC Radio Network Controller
RRC Radio Resource Control
SPS Semi-Persistent Scheduling
TTI Transmission Time Interval
UE User Equipment
UL Uplink
WAN Wide Area Network

The invention claimed is:

1. A method in a wireless device for adaptive HARQ retransmissions, the method comprising:
receiving, from a network node, at a wireless device configured to skip uplink transmissions, a request to initiate an adaptive hybrid automatic repeat request (HARQ) retransmission, the HARQ retransmission request comprising HARQ information and addressed to a semi-persistent scheduling (SPS) cell radio network temporary identifier (C-RNTI) of the wireless device;
identifying a HARQ process associated with the HARQ retransmission request;
determining whether an uplink grant has been indicated for the HARQ process;
determining whether a HARQ buffer of the HARQ process is empty, the HARQ buffer associated with data to be transmitted to the network node; and
in response to determining that the HARQ buffer is empty and that the request was addressed to the SPS C-RNTI of the wireless device, ignoring the uplink grant.

2. The method of claim 1, further comprising: determining that a medium access control (MAC) entity of the wireless device is configured to skip an uplink transmission when no uplink data is available.

3. The method of claim 1, further comprising:
prior to receiving the HARQ retransmission request from the network node:
determining that no uplink data is available for transmission to the network node; and
skipping a scheduled uplink transmission to the network node.

4. The method of claim 1, wherein the request to initiate an adaptive HARQ retransmission received from the network node comprises a new data indicator (NDI) that has not been toggled.

5. A wireless device for adaptive HARQ retransmission, comprising:
an interface, at a wireless device configured to skip uplink transmissions, configured to receive, from a network node, at a wireless device configured to skip uplink transmissions, a request to initiate an adaptive hybrid automatic repeat request (HARQ) retransmission, the HARQ retransmission request comprising HARQ information and addressed to a semi-persistent scheduling (SPS) cell radio network temporary identifier (C-RNTI) of the wireless device; and
processing circuitry communicatively coupled to the interface, the processing circuitry configured to:
identify a HARQ process associated with the HARQ retransmission request;
determine whether an uplink grant has been indicated for the HARQ process;
determine whether a HARQ buffer of the HARQ process is empty, the HARQ buffer associated with data to be transmitted to the network node and that the request was addressed to the SPS C-RNTI of the wireless device; and
in response to determining that the HARQ buffer is empty and that the request was addressed to the SPS C-RNTI of the wireless device, ignoring the uplink grant.

6. The wireless device of claim 5, wherein the processing circuitry is further configured to determine that a medium access control (MAC) entity of the wireless device is configured to skip an uplink transmission when no uplink data is available.

7. The wireless device of claim 5, wherein the processing circuitry is further configured to:
prior to receiving the HARQ retransmission request from the network node:
determine that no uplink data is available for transmission to the network node; and
skip a scheduled uplink transmission to the network node.

8. The wireless device of claim 5, wherein the request to initiate an adaptive HARQ retransmission received from the network node comprises a new data indicator (NDI) that has not been toggled.

9. The method of claim 1, wherein the wireless device configured to skip uplink transmissions comprises a wireless device in which skipUplinkTxSPS is configured.

10. The wireless device of claim 5, wherein the wireless device configured to skip uplink transmissions comprises a wireless device in which skipUplinkTxSPS is configured.

* * * * *